June 5, 1951 — J. A. COWARD — 2,555,397
TROTLINE HOLDER
Filed March 28, 1949
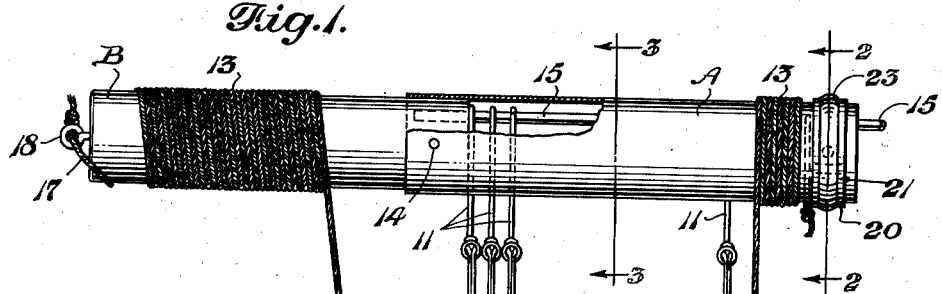
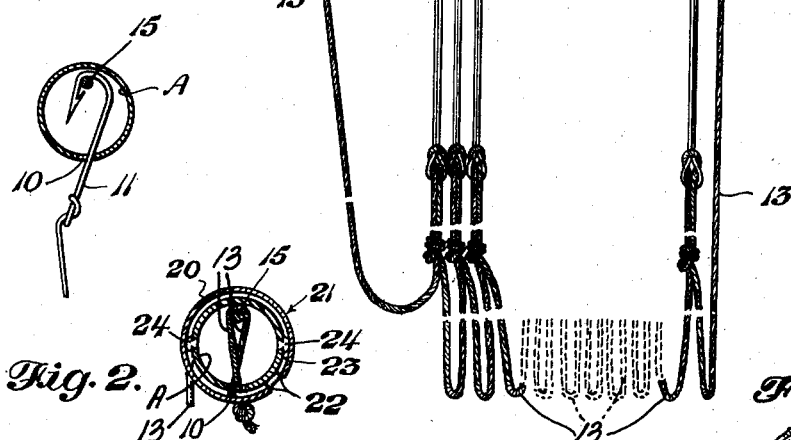
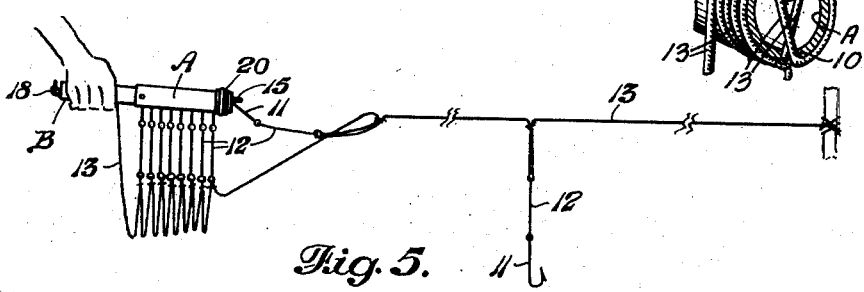
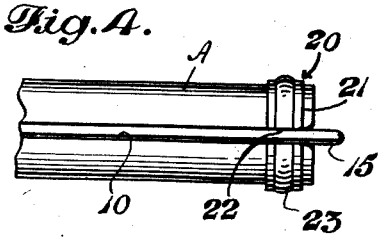
Inventor
James A. Coward,
By Munn H. Hare
ATTORNEY Patented June 5, 1951

2,555,397

UNITED STATES PATENT OFFICE 2,555,397

TROTLINE HOLDER

James A. Coward, Wichita, Kans.

Application March 28, 1949, Serial No. 83,990

13 Claims. (Cl. 43—27.4)

The invention relates to improvements in trotline holders.

One of the objects of the invention is to provide a handle for such holder which readily and easily fits the hand of the user and which gives the operator complete control of the holder and of the flow of hooks from the holder in setting the line.

Another object of the invention is to provide a hook rod within the hollow body of the holder so placed that any size fish hook may be used and numerous hooks may be carried in the barrel at one time.

Another object of the invention is to provide a holder having a slot with polished edges through which slot the shanks of the hooks move so that the hooks will slide easily from the holder, whereby when one end of the line is secured to a fixed point and the manipulator of the holder moves away from the point of attachment of the line, the hooks will feed out of the holder automatically and at any desired speed controlled only by the speed of movement of the holder.

Another object of the invention is to provide a holder with a handle extending longitudinally from one end of the barrel and providing an end closure therefor.

A further object of the invention is to provide a holder having at one end an attaching device for one end of the trotline whereby if the holder is dropped while in use it will not be lost and may be recovered merely by pulling in the line.

A further object of the invention is to provide a holder which, if dropped, may be recovered without tangling the line, the hooks merely continuing to feed out of the holder as movement away from the point of attachment continues.

A further object of the invention is to provide a slip lock at one end of the barrel which may be readily operated to open or close the slot in the barrel.

A further object of the invention is to provide a holder with a smooth, unobstructed exterior which may be used for wrapping the excess line in order to keep the line in good shape and prevent its becoming tangled.

A further object of the invention is to provide a holder having means for retaining the end of the wrapped line in place, thus keeping the line in firm condition and preventing tangling.

Other objects of the invention will be apparent to those skilled in the art from a consideration of the accompanying drawings and the following detailed description, which are intended as illustrative of the inventive thought rather than as limiting the invention to the exact details set forth.

In the drawings:

Fig. 1 is a side elevation of the holder, parts being shown in section, showing the line partly wound on the exterior of the holder, and showing the locking ring in closed position to retain the hooks within the holder and the end of the line in firmly clamped position;

Fig. 2 is a section on line 2—2 of Fig. 1 showing the manner in which the end of the line is clamped by the locking ring;

Fig. 3 is a section on the line 3—3 of Fig. 1;

Fig. 4 is a bottom view of a portion of the end of the holder remote from the handle, and showing the ring in unlocking position;

Fig. 5 is a perspective view showing the operation of the holder in automatically releasing the hooks from the holder as the holder is moved away from a point to which one end of the trotline is anchored; and Fig. 6 is a fragmentary perspective view of the slotted end of the holder showing the line wound thereon and passing through the slotted portion.

Referring in detail to the drawings, the reference numeral A denotes a slotted metal barrel for retaining a plurality of hooks attached to a trotline and for automatically delivering the same when setting the line. One end of the barrel is open and is provided with a suitable slip or slide lock which, in closed position, serves to retain the hooks within the barrel, and when in open position allows them to be fed freely from the barrel. The opposite end of the barrel is closed by means of a solid handle B which fits part way into the barrel A and forms a continuation thereof. Both the barrel and handle are preferably cylindrical in form and smooth on their exterior surface and are adapted to serve as a reel for winding the excess trotline, which may be smoothly wound upon the surface of the holder, one end of the line being secured to an eye or other suitable fastening means at the end of the handle, and the other end of the wrapped line being adapted to be releasably held in place by means of the slip or slide lock, which lock also serves to retain the trotline hooks in position.

As shown the barrel A is cylindrical in form and is preferably composed of light weight metal which is not readily corroded. A suitable metal for this purpose is aluminum, which combines the functions of lightness and resistance to corrosion. Extending lengthwise of the barrel A is a slot 10, the edges of which are preferably highly polished so as to permit the shanks of the fish hooks 11 to slide freely therealong. The fish hooks 11 may be of any desired size and are carried by leaders 12 attached at intervals to the trotline 13 in the usual manner.

As shown, one end of the barrel A is open while the other end is closed by the handle portion B. This handle is preferably of wood whereby the holder is adapted to float if accidentally dropped into the water while in operation. One end of the handle member extends a substantial distance into the barrel member and the parts are preferably permanently secured together by any suitable means 14, although if desired the parts may be removable. Extending from the handle B into the barrel, and preferably projecting a short distance beyond the end of the barrel, is a fish hook holding rod 15, preferably of metal and highly polished, over which the hooks 11 pass while their shanks 16 extend through the slot 10. One end 17 of the trotline 13 may be secured to the end of the handle B remote from the barrel A by any suitable means, as, for example, the screw eye 18 projecting axially from the handle portion.

The open end of the slot 10 at the end of barrel A opposite the handle B, as shown, is controlled by suitable slip or slide lock mechanism 20 which, with the rod 15 and the slot 10, may also be employed for retaining the end of the wrapped trotline in firm position until such time as the trotline is about to be used. The lock 20 is readily operated to release the end of the trotline and also to permit the automatic removal of the hooks in setting the line.

As shown, the locking means 20 comprises a resilient metal band 21 partially encircling the end of the barrel A, but with its end separated at 22. The band is enlarged intermediate its ends to form a hollow rib 23 and this enlargement cooperates with projecting lugs 24 extending outwardly from the body of the barrel A. These lugs in cooperation with the rib 23 of the band or ring 21 prevent accidental endwise removal of the ring and at the same time permit rotation of the ring. In securing the end of the wrapped trotline in position so as to retain the line smoothly upon the exterior of the holder the line is passed over the rod 15 and then brought back through the slot 10, after which the ring or band 21 is rotated so as to bring the open portion 22 of the band out of registry with the slot 10. This operation also retains the hooks in position within the barrel.

When the device is ready for use one end of the trotline is secured to a stake or other fixed object, after which the slide lock 20 is rotated to bring the open portion of the ring 21 into registry with the slot 10 in the barrel of the holder. The looped over portion of the trotline may then be removed from the rod 15 and as the holder is moved away from the stake or other fixed object to which one end of the line is secured the hooks which have been housed within the barrel are automatically withdrawn one at a time from the open end of the barrel, these hooks sliding freely over the polished rod 15 and their shanks sliding freely between the polished sides of the slot in the barrel member. Should the holder be dropped while the device is in use it will in general float unless the handle portion is overweighted by the barrel portion and contents thereof, but in any event the holder can be recovered by simply pulling in the line, one end of which is secured to the end of the handle of the holder.

The invention has been described in detail for the purpose of illustration but it will be obvious that numerous modifications and variations may be resorted to without departing from the spirit of the invention.

I claim:

1. A trotline holder comprising a slotted barrel member, a handle projecting axially from the barrel member and closing one end of the barrel member, and a fish hook hanger comprising a rod separate from the barrel member extending lengthwise through the barrel member parallel to the slot.

2. A trotline holder comprising a slotted barrel member, a handle projecting axially from the barrel member and closing one end of the barrel member, a fish hook hanger comprising a rod separate from the barrel member extending lengthwise through the barrel member parallel to the slot, and releasable means for closing the slot at the end remote from the handle.

3. A trotline holder comprising a slotted barrel member, a handle projecting axially from the barrel member and closing one end of the barrel member, and a fish hook hanger extending lengthwise through the barrel member parallel to the slot, said hanger comprising a rod projecting from the handle and separate from the barrel member.

4. A trotline holder comprising a slotted barrel member, a handle projecting axially from the barrel member and closing one end of the barrel member, and a fish hook hanger extending lengthwise through the barrel member parallel to the slot, said hanger comprising a rod separate from the barrel member and projecting from the handle and extending beyond the remote end of the barrel member.

5. A trotline holder comprising a slotted barrel member, a handle projecting axially from the barrel member and closing one end of the barrel member, and a fish hook hanger comprising a rod separate from the barrel member and extending lengthwise through the barrel member parallel to the slot, the handle member serving as a float for the holder.

6. A trotline holder comprising a slotted barrel member, a handle projecting axially from the barrel member and closing one end of the barrel member, and a fish hook hanger comprising a rod separate from the barrel member and extending lengthwise through the barrel member parallel to the slot, said handle having means at its end remote from the barrel member for attachment of one end of the trotline.

7. A trotline holder comprising a slotted barrel member, a handle projecting axially from the barrel member and closing one end of the barrel member, and a fish hook hanger comprising a rod separate from the barrel member and extending lengthwise through the barrel member parallel to the slot, said trotline holder being cylindrical in form and serving as a reel on which to wind a portion at least of the trotline.

8. A trotline holder comprising a slotted barrel member, a handle projecting axially from the barrel member and closing one end of the barrel member, a fish hook hanger comprising a rod separate from the barrel member and extending lengthwise through the barrel member parallel to the slot, said trotline holder being cylindrical in form and serving as a reel on which to wind a portion at least of the trotline, and locking means comprising a rotatable split ring for releasably securing one end of the trotline when wound on the holder.

9. A trotline holder comprising a slotted barrel member, a handle projecting axially from the barrel member and closing one end of the barrel member, a fish hook hanger comprising a rod separate from the barrel member and extending lengthwise through the barrel member parallel to the slot, and releasable means comprising a rotatable split ring adapted to open or close the slot at the end remote from the handle.

10. A trotline holder of generally cylindrical form about which a portion at least of the trotline is adapted to be wound, said holder comprising a barrel member adapted to releasably house a plurality of fish hooks carried by the trotline, a handle projecting lengthwise from one end of the barrel and serving to close one end thereof, means at the remote end of the handle for attachment of one end of the trotline, said barrel having a longitudinal slot extending to the end thereof remote from the handle, a fish hook supporting rod extending lengthwise of the barrel member from said handle, said rod being parallel to and spaced from the longitudinal slot, said rod and the walls of said slot being polished to permit free sliding movement of fish hooks carried by said rod and having their shanks extending through said slot, and means for releasably closing the slot at the end remote from the handle comprising a split ring-like member mounted for rotation adjacent the end of the barrel, and means to prevent accidental axial movement of the ring-like member upon the barrel.

11. In combination with a trotline carrying a plurality of hooks, a trotline holder comprising a slotted barrel member adapted to releasably house a plurality of hooks carried by the trotline, said holder being cylindrical in form and serving as a reel on which to wind a portion at least of the trotline, releasable securing means at one end of the holder for releasably closing one end of the slot to retain or release the hooks and also serving to releasably retain a portion of the line when wound on the holder, a closure for the other end of the holder, trotline attaching means for one end of the line carried by the closure, and fixed means separate from the holder for securing the opposite end of the trotline, whereby when the releasable securing means at the open end of the holder is in releasing position the trotline may be set by simply moving the holder away from said fixed line securing means, thereby unreeling the portion of the line wound about the holder and withdrawing the hooks from the holder, the fixed line securing means also serving to prevent loss of the trotline and holder.

12. A holder for a trotline carrying a plurality of hooks, said holder comprising a slotted barrel member adapted to releasably house the hooks carried by the trotline and being adapted to serve as a reel on which a portion at least of the trotline may be wound, securing means at one end of the holder for releasably closing one end of the slot to retain or release the hooks, said securing means also serving to releasably retain a portion of the line when wound on the holder, a closure for the other end of the holder, trotline attaching means for one end of the line carried by said closure, the other end of the line being adapted to be attached to a fixed object separate from the holder whereby when the releasable securing means at the open end of the holder is in releasing position the trotline may be set by simply moving the holder away from the fixed line securing means, thereby unreeling the portion of the line wound about the holder and withdrawing the hooks from the holder, the fixed line securing means also serving to prevent loss of the trotline holder.

13. A holder for a trotline carrying a plurality of hooks, said holder comprising a slotted barrel member adapted to releasably house the hooks carried by the trotline and being adapted to serve as a reel on which a portion at least of the trotline may be wound, securing means at one end of the holder for releasably closing one end of the slot to retain or release the hooks, said securing means also serving to releasably retain a portion of the line when wound on the holder, a closure for the other end of the holder, trotline attaching means for one end of the line carried by said closure, the other end of the line being adapted to be attached to a fixed object separate from the holder whereby when the releasable securing means at the open end of the holder is in releasing position the trotline may be set by simply moving the holder away from the fixed line securing means, thereby unreeling the portion of the line wound about the holder and withdrawing the hooks from the holder, the fixed line securing means also serving to prevent loss of the trotline, the holder having a handle portion of lower specific gravity than water, and serving as a float for the holder whereby the same may be readily recovered if dropped during the setting operation.

JAMES A. COWARD.

REFERENCES CITED

The following references are of record in the file of this patent:

UNITED STATES PATENTS

| Number | Name | Date |
|---|---|---|
| 327,100 | Palm | Sept. 29, 1881 |
| 921,902 | Smith | May 18, 1909 |
| 1,221,904 | Potier | Apr. 10, 1917 |
| 1,629,583 | Nelson | May 24, 1927 |
| 1,634,030 | Korkames | June 28, 1927 |
| 2,158,947 | Purdum | May 16, 1939 |
| 2,242,509 | Coalson | May 20, 1941 |